United States Patent
Wilson

(10) Patent No.: US 9,049,184 B2
(45) Date of Patent: *Jun. 2, 2015

(54) SYSTEM AND METHOD FOR PROVISIONING A UNIQUE DEVICE CREDENTIALS

(71) Applicant: Aruba Networks, Inc., Sunnyvale, CA (US)

(72) Inventor: David Wilson, Mountain View, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/762,097

(22) Filed: Feb. 7, 2013

(65) Prior Publication Data

US 2013/0269011 A1    Oct. 10, 2013

Related U.S. Application Data

(63) Continuation of application No. 13/439,705, filed on Apr. 4, 2012, now Pat. No. 8,392,712.

(51) Int. Cl.
*H04L 29/06* (2006.01)
*H04W 12/06* (2009.01)

(52) U.S. Cl.
CPC ............ *H04L 63/08* (2013.01); *H04L 63/0823* (2013.01); *H04L 63/205* (2013.01); *H04W 12/06* (2013.01)

(58) Field of Classification Search
None
See application file for complete search history.

(56) References Cited

U.S. PATENT DOCUMENTS

| 5,418,854 | A | 5/1995 | Kaufman et al. |
| 8,458,308 | B1* | 6/2013 | Steves ........................... 709/223 |
| 2003/0200437 | A1 | 10/2003 | Oishi |
| 2004/0266449 | A1 | 12/2004 | Smetters et al. |
| 2008/0049779 | A1* | 2/2008 | Hopmann et al. ............ 370/431 |
| 2008/0168547 | A1 | 7/2008 | Cheeniyil et al. |
| 2009/0276848 | A1 | 11/2009 | Suzuki et al. |
| 2011/0067092 | A1 | 3/2011 | Baker et al. |

OTHER PUBLICATIONS

Motorola: "BYOD: Bring your own device. On-boarding and securing devices in your corporate network.", 2011, XP00211827, Retrieved from the Internet: URL:http://www.motorolasolutions.com/web/Business/Products/Wireless%20LAN%20Devices/_Documents/_static%20files/BY0D+-+Bring+Your+Own+Device.pdf [retrieved on Aug. 27, 2013] the whole document.

International Application No./Patent No. PCT/US2013/028391; Notification of Transmittal of the International Search Report and the Written Opinion of the International Searching Authority, or the Declaration; Mailed Sep. 12, 2013.

United States Patent Application No. 13/439,705, Non-Final Office Action, mailed Jun. 11, 2012.

* cited by examiner

*Primary Examiner* — David Pearson
(74) *Attorney, Agent, or Firm* — Ying Wang

(57) ABSTRACT

According to one embodiment of the invention, a method for controlling access to a network comprises a first operation of determining a type of electronic device to join the network. Then, unique device credentials are sent to the electronic device. These unique device credentials are used in authenticating the electronic device, and the format of the unique device credentials is based on the type of electronic device determined.

21 Claims, 10 Drawing Sheets

SYSTEM AND METHOD FOR PROVISIONING A UNIQUE DEVICE CREDENTIALS

PRIORITY CLAIM; INCORPORATION BY REFERENCE

The present application claims priority as a Continuation of application Ser. No. 13/439,705 filed on Apr. 4, 2012, the entire content of which is hereby incorporated by reference.

FIELD

Embodiments of the present disclosure relate to the field of network communications, and in particular a system and method for identifying electronic devices in a dynamic environment and provisioning unique device credentials to those devices for enabling secured communications.

BACKGROUND

Until fairly recently, wireless networks were configured to only support wireless devices that were pre-approved by a network administrator. Typically, this required an incoming guest to register her wireless device (e.g., laptop computer) with the network administrator. This was problematic because the normal registration process was quite labor intensive from an IT perspective and, in many cases, caused new guests to wait an unreasonable amount of time before a network administrator could register her laptop computer.

At that time, for device registration, the network administrator manually uploaded either the unique media access control (MAC) address of the laptop computer or its newly assigned identifier into a database. Tasked with the responsibility of controlling access to the wireless network, an authentication server accessed the database whenever a wireless device sought access to the wireless network. If the wireless device was registered, it was granted access to the wireless network. Otherwise, access was denied.

Recently, however, wireless networks are being adapted to support "Bring-Your-Own-Device" (BYOD) environments, where all users are able to access a targeted wireless network through their personal devices, such as laptop computers, tablets, or smartphones for example. As a result, the number of devices per network user has grown from a one-to-one relationship to a one-to-many relationship as a network user may simultaneously or interchangeably connect to a network using multiple devices.

Granting enterprise access to personal devices has direct implications on security and network control. Security challenges range from understanding who and what is connected to the network to keeping the network malware-free, including proper enforcement and compliance with access policies.

Currently, in supporting a BYOD networking environment, secure access to the network is provisioned through an authentication scheme that involves an exchange of digital certificates. However, certain types of wireless devices, most notably Android® based smartphones, are not suited for this type of authentication scheme. The reason is that Android® based smartphones appear to automatically accept any issued digital certificates, without issuing a request for user acceptance before releasing information pertaining to the smartphone. Thus, this device is susceptible to "man-in-the-middle" attacks, which can reduce the security of the network as a whole.

A method of provisioning unique device credentials in a universal matter for all device types is strongly needed.

BRIEF DESCRIPTION OF THE DRAWINGS

Embodiments of the present disclosure are illustrated by way of example, and not by way of limitation, in the figures of the accompanying drawings and in which.

DETAILED DESCRIPTION

Figure 1:
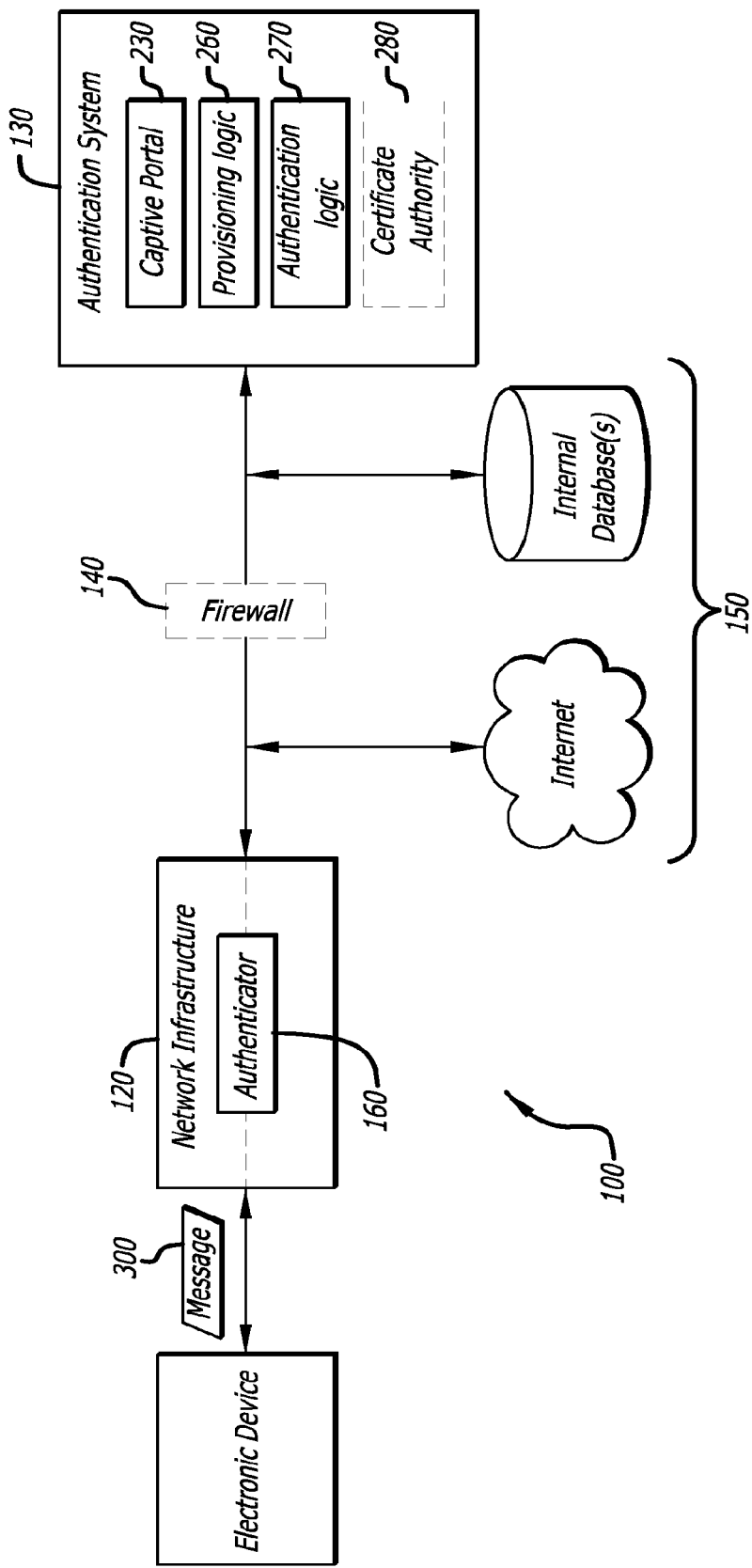
FIG. 1 is a general block diagram of a network with port-based network access control that features device credential provisioning and device credential authentication.

In the following description, several specific details are presented to provide a thorough understanding of the invention. While the context of the disclosure is directed to provisioning secure network access, one skilled in the relevant art may recognize, however, that the concepts and techniques disclosed herein can be practiced without certain details such as the exclusion of one or more operations, certain logic, or the like.

Herein, certain terminology is used to describe features for embodiments of the disclosure. For example, the term "electronic device" generally refers to any device that includes logic adapted to communicate with a network and/or process information related to such communications. Different categories of electronic devices may include, but are not limited or restricted to (1) a client device being any consumer electronics with network connectivity (e.g., tablet; laptop; desktop; netbook; television; set-top box; video gaming control;

mobile handset with cellular and/or wireless connectivity such as a smartphone, personal digital assistant "PDA"; etc.); (2) an access point; (3) a data transfer device (e.g., network switch, router, controller, brouter, firewall, etc.); (4) an authentication server; or the like.

It is contemplated that an electronic device may include hardware logic, including one or more of the following: (i) processing circuitry; (ii) one or more communication interfaces such as radios (e.g., component that handles the wireless data transmission/reception) and/or physical connectors to support wired connectivity; and/or (iii) a non-transitory computer-readable storage media (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Additionally, the term "logic" is generally defined as hardware and/or software. As hardware, logic may include processing circuitry (e.g., a controller, a processor, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, a source code, an object code, a shared library/dynamic load library, or one or more instructions. These software modules may be stored in any type of a suitable non-transitory storage medium (described above) or transitory computer-readable transmission media (e.g., electrical, optical, acoustical or other form of propagated signals such as carrier waves, infrared signals, digital signals).

The term "interconnect" is broadly defined as a logical or physical communication path such as, for instance, electrical wire, optical fiber, cable, bus trace, or a wireless channel using infrared, radio frequency (RF), or any other wireless signaling mechanism. The term "message" constitutes any grouping of data in the form of a packet, a frame, an Asynchronous Transfer Mode (ATM) cell, or any other series of bits having a prescribed format.

Lastly, the terms "or" and "and/or" as used herein are to be interpreted as an inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Certain details are set forth below in order to provide a thorough understanding of various embodiments of the invention, albeit the invention may be practiced through many embodiments other that those illustrated. Well-known logic and operations may not be set forth in detail in order to avoid unnecessarily obscuring this description. Moreover, the illustrated embodiments of the disclosure, and the description associated therewith, should be considered as examples of the principles of the invention and not intended to limit the disclosure to those specific embodiments. It should be understood that this disclosure covers all modifications, equivalents, and alternatives falling within the spirit and scope of the present disclosure.

General Network Architecture

Referring to FIG. 1, a general block diagram of a network 100 with port-based network access control that features device credential provisioning and device credential authentication is shown. According to this embodiment of the disclosure, network 100 is a local area network (LAN) with port-based network access control in accordance with Institute of Electrical and Electronic Engineers (IEEE) 802.1X entitled "Port Based Network Access Control" (2010). Such access control is adapted to provide security against an electronic device gaining unauthorized access to various network resources 150 (e.g., Internet, internal databases, etc.).

More specifically, authentication in accordance with the IEEE 802.1X Standard involves communications between (i) an electronic device (e.g., client device 110) seeking to join network 100 and (ii) certain components forming network 100, namely network infrastructure 120 and an authentication system 130. As shown, an optional firewall 140 may be positioned to isolate authentication system 130 from publicly accessible services. However, with respect to the operational flow described below, firewall 140 will not be discussed.

As illustrated, network infrastructure 120 is a collection of electronic devices that is adapted to support communications between authentication system 130 and client device 110. Moreover, network infrastructure 120 is adapted to initially restrict access to network resources 150 until the identity of client device 110 has been authenticated. The components formulating network infrastructure 120 may vary, depending on the selected network architecture.

Figure 2A:
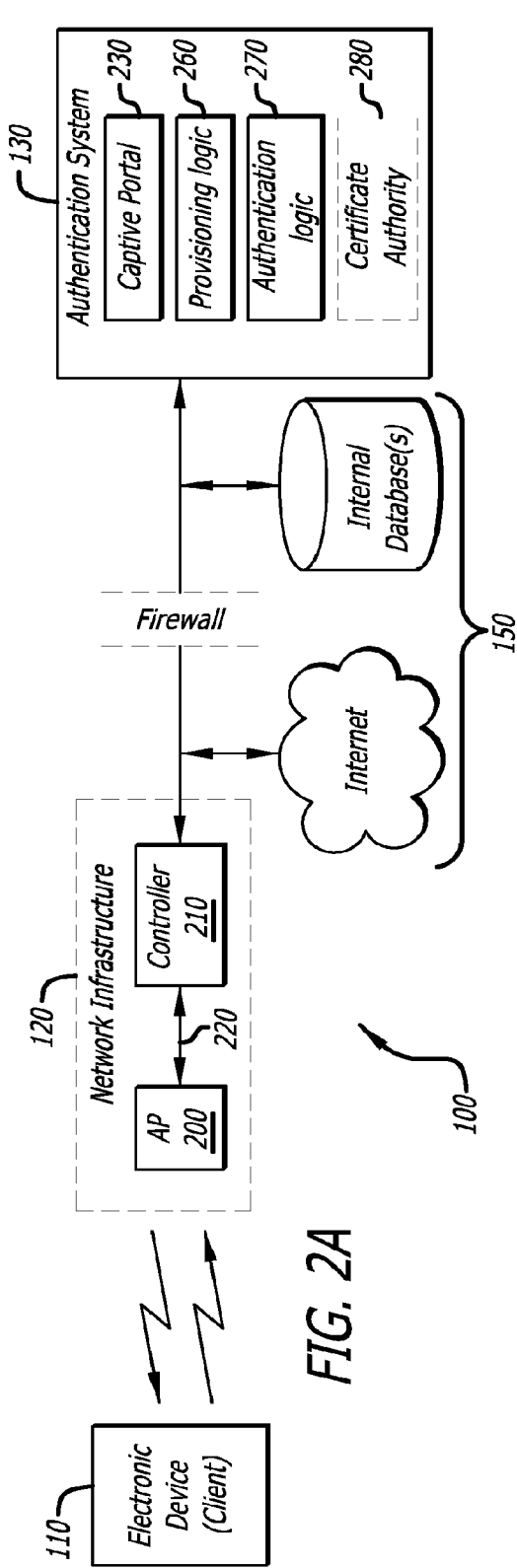
FIG. 2A is an exemplary block diagram of the network infrastructure within a wireless network that supports device credential provisioning.

For instance, as shown in FIG. 2A, where network 100 is a wireless local area network (WLAN), network infrastructure 120 comprises an access point (AP) 200 that is coupled to controller 210 over interconnect 220. Herein, AP 200 is configured to establish communications with wireless electronic devices within its coverage area such as client device 110 for example. Controller 210 is configured to monitor messages received by AP 200 from client device 110 and determine what "role" is to be assigned to client device 110. In other words, controller 210 assigns client device 110 to a specific role (e.g. network access level), which may partially or completely restrict access by client device 110 to network resources 150 until the identity of client device 110 has been authenticated. As an example, controller 210 may restrict access to network resources 150 by redirecting certain messages from client device 110 to a Captive Portal instance 230 supported by authentication system 130.

Figure 2B:
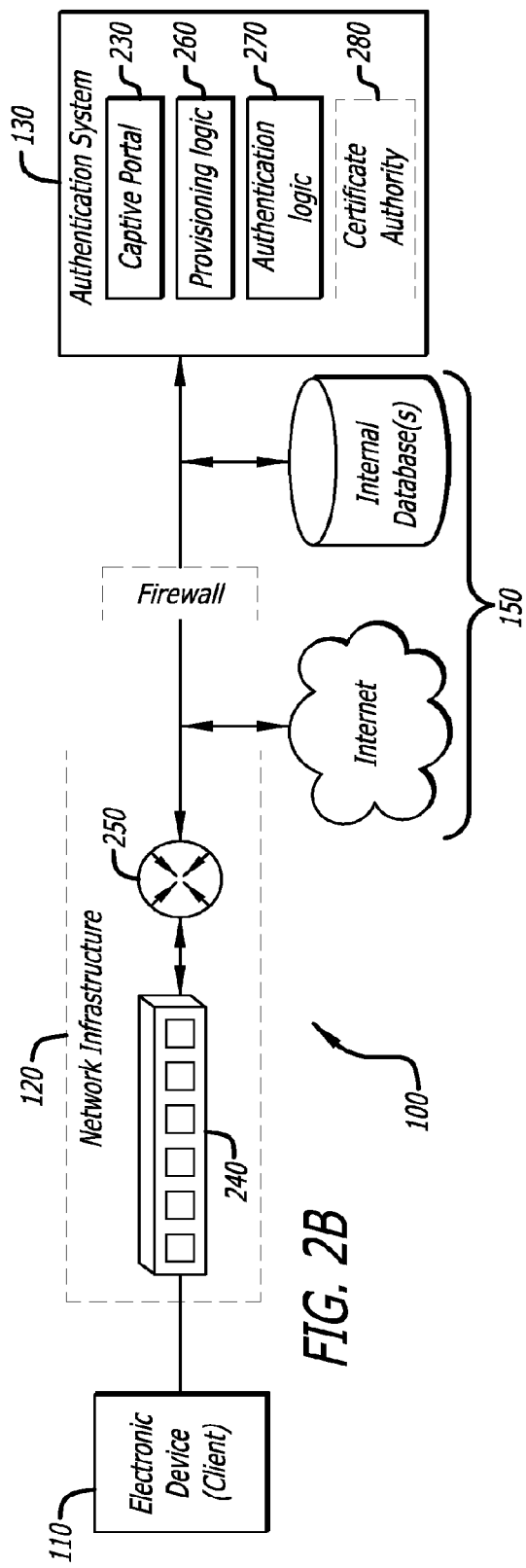
FIG. 2B is an exemplary block diagram of the network infrastructure within a wired network that supports device credential provisioning.

Alternatively, as shown in FIG. 2B, where network 100 is a local area network (LAN) supporting wired connectivity with client device 110, network infrastructure 120 comprises one or more data transfer devices, such as manageable switch 240 (e.g. 802.1X switch) and router 250, that also determine a particular role for client device 110. Where client device 110 is attempting to join network 100 for the first time, manageable switch 240 assigns client device 110 to a provisioning role, which may trigger redirection of certain messages from client 110 to Captive Portal instance 230 until the identity of client device 110 has been authenticated.

Referring back to FIG. 1, after a communication path has been established with client device 110, an electronic device within network infrastructure 120, such as controller 210 or switch/router 240 and 250 (hereinafter generally referred to as an "authenticator" 160), may perform device fingerprinting. "Device fingerprinting" involves the monitoring of initial messages transmitted by client device 110 to determine whether client device 110 has been previously authenticated.

One type of "device fingerprinting" involves analysis of contents within a DHCP Options field of a DHCP Discovery message. Client device 110 broadcasts a DHCP Discovery message in efforts to obtain an Internet Protocol (IP) address for use on network 100. In many cases, the content within the DHCP Options field suggests the type of device, which may assist authenticator 160 in determining whether client device 110 should be placed into a provisioning role.

More specifically, if authenticator 160 is unable to recognize an identity of client device 110 as the device type is not identifiable, client device 110 is placed into a provisioning role, which restricts its access to network resources 150 and, in some cases, may trigger communications with Captive Portal instance 230 for subsequent requests for access to network resources 150.

Another type of "device fingerprinting" may involve authenticator 160 gaining access to a media access control (MAC) address of client device 110. This may be accomplished by extracting the source MAC address from signaling originating from client device 110. The MAC address of control device 110 is compared to stored MAC addresses for devices that have been previously authenticated. If the MAC address of client device 110 fails to match any of the stored MAC addresses, authenticator 160 places client device 110 into a provisioning role.

It is contemplated that the stored MAC addresses for previously authenticated client devices may be contained within a MAC table, which is updated at a periodicity selected by the network administrator. Hence, if there is no activity from one of the client devices for a predetermined period of time, the MAC address of that device is removed from the MAC table.

Yet another type of "device fingerprinting" may involve authenticator 160 comparing a username provided during an initial message exchange between client device 110 and authentication system 130. The username provided by control device 110 may be compared to active usernames that are used by previously authenticated electronic devices and stored within network infrastructure 120 and/or authentication system 130.

Once client device 110 has been assigned a provisioning role, namely the device is substantially restricted (or precluded) from accessing network resources 150, any messages from device 110 may be redirected by authenticator 160 to Captive Portal instance 230 located in authentication system 130. The redirected messages are for those situations where client device 110 has not been authenticated which, in some situations, may be due to the lack of provisioning of unique device credentials to client device 110.

As an illustrative example, in response to a message 300 (e.g., HTTP Get Request message) from client device 110 placed in a provisioning role, authenticator 160 redirects the message to Captive Portal instance 230 provided by authentication system 130. Provisioning logic 260 within authentication system 130 analyzes the message to determine the type of client device 110 and infers its capabilities.

Figure 3:
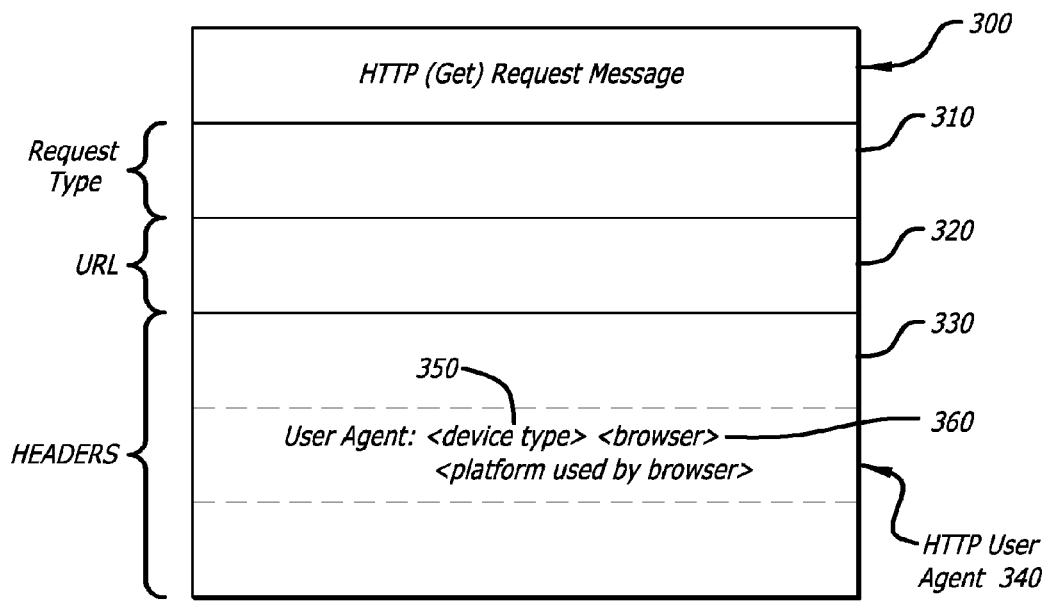
FIG. 3 is an exemplary diagram of Request message issued by a requesting electronic device commencing a Provisioning Stage for obtaining unique device credentials.

As shown in FIG. 3, HTTP GET Request message 300 comprises a plurality of information fields including, but not limited or restricted to (1) Request Type 310 (e.g., GET, etc.), (2) requested uniform resource locator (URL) 320 (e.g., www.name.com) and (3) headers 330 including an HTTP User Agent header 340. "HTTP User Agent" header 340 is used to identify a source of the HTTP GET Request (e.g. client device 110). HTTP User Agent header 340 comprises a number of subfields including, but not limited or restricted to (i) device type 350, (ii) browser information 360, or the like. Information within HTTP User Agent header 340 is used to infer what type of unique device credentials are supported by client device 110.

Referring back to FIG. 1, based on device information received from the incoming message from client device 110, provisioning logic 260 within authentication system 130 initiates a device credential provisioning scheme to (1) determine the device type for client device 110 and (2) provision (provide) unique device credentials based on the device type. For instance, where client device 110 is an Apple® platform (e.g., iPhone™, iPad™, etc.) and is adapted with capabilities to support certificate-based authentication protocols (e.g. Extensible Authentication Protocol-Transport Layer Security or "EAP-TLS"), provisioning logic 260 provides a first type of unique device credential (e.g., digital certificate) to client device 110.

However, where client device 110 is configured to support an authentication protocol other than a certificate-based authentication protocol, such as a username/password based authentication protocol (e.g., Protected Extensible Authentication Protocol "PEAP", EAP-MD5 , EAP-GTC, etc.), provisioning logic 260 provides another type of unique device credential (e.g., username and password) to client device 110. According to one embodiment of the invention, this unique device credential is information derived from a digital certificate generated for and corresponding to client device 110 as described below.

Upon receipt, the unique device credential is stored and provided by client device 110 during an Authentication Stage when it is attempting to connect to network 100.

Figure 2C:
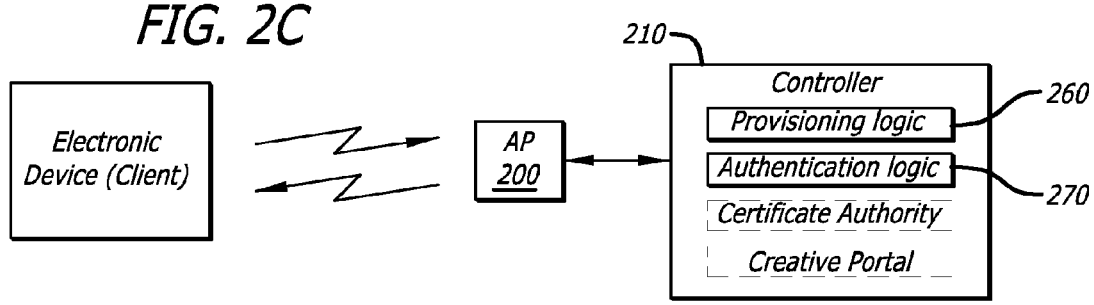
FIG. 2C is another exemplary block diagram of a network that supports device credential provisioning and device credential authentication.

Referring now to FIG. 2C, another detailed exemplary block diagram of network 100 supporting device credential provisioning and device credential authentication is shown. Herein, in lieu of relying on authentication system 130 to provision unique device credentials to client device 110, controller 210 handles such operations. This requires controller 210 to be adapted to with provisioning logic 260 and authentication logic 270 in order to (i) determine the device type of client device 110, (ii) provision unique device credentials based on this determination, and (iii) authenticate the device credentials.

Figure 2D:
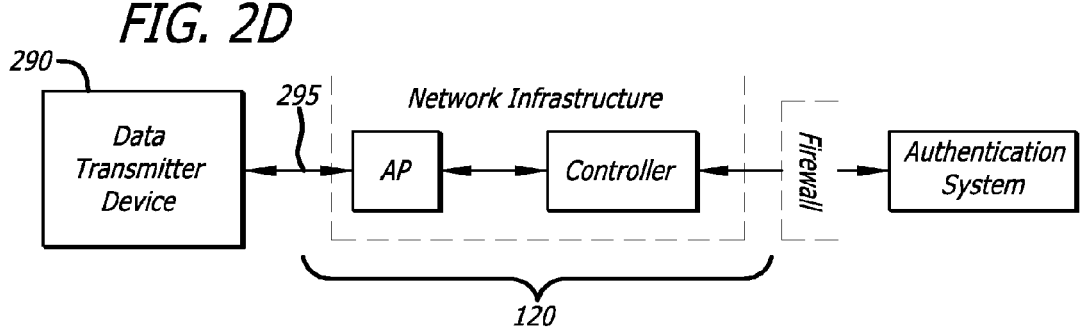
FIG. 2D is another exemplary block diagram of a network that supports device credential provisioning to a data transfer device and device credential authentication.

Referring to FIG. 2D, another detailed exemplary block diagram of network 100 supporting device credential provisioning and device credential authentication is shown. Herein, a data transfer device 290 is physically coupled via interconnect 295 to an available port on network infrastructure 120. Therefore, a variety of electronic devices other than client devices may be initially set into a provisioning role and subsequently awarded a unique device credential for use in authentication as described below.

Operational Flow for Unique Device Credential Provisioning

In order to provision secure network access for any device attempting to access the network, regardless of device type, three (3) operational stages are conducted by the authentication system. The first operational stage, referred to as "Pre-Provisioning Stage," involves operations by the authentication system to learn the type of electronic device attempting to join a network. The second operational stage, referred to as "Provisioning Stage," involves the operation by the authentication system to provide unique device credentials to the electronic device for use during the Authentication stage (described below).

Lastly, the third operational stage, referred to as "Authentication Stage," involves operations by the authentication system to receive unique device credentials from the electronic device and, where appropriate, to authenticate the electronic device. Upon receipt of the unique device credentials, the authentication system determines (i) whether the device credentials are valid, (ii) whether the electronic device is authorized to join the network, and if so (iii) what access restraints, if any, are to be imposed on its network connectivity.

A. Pre-Provisioning Stage

Figure 4:
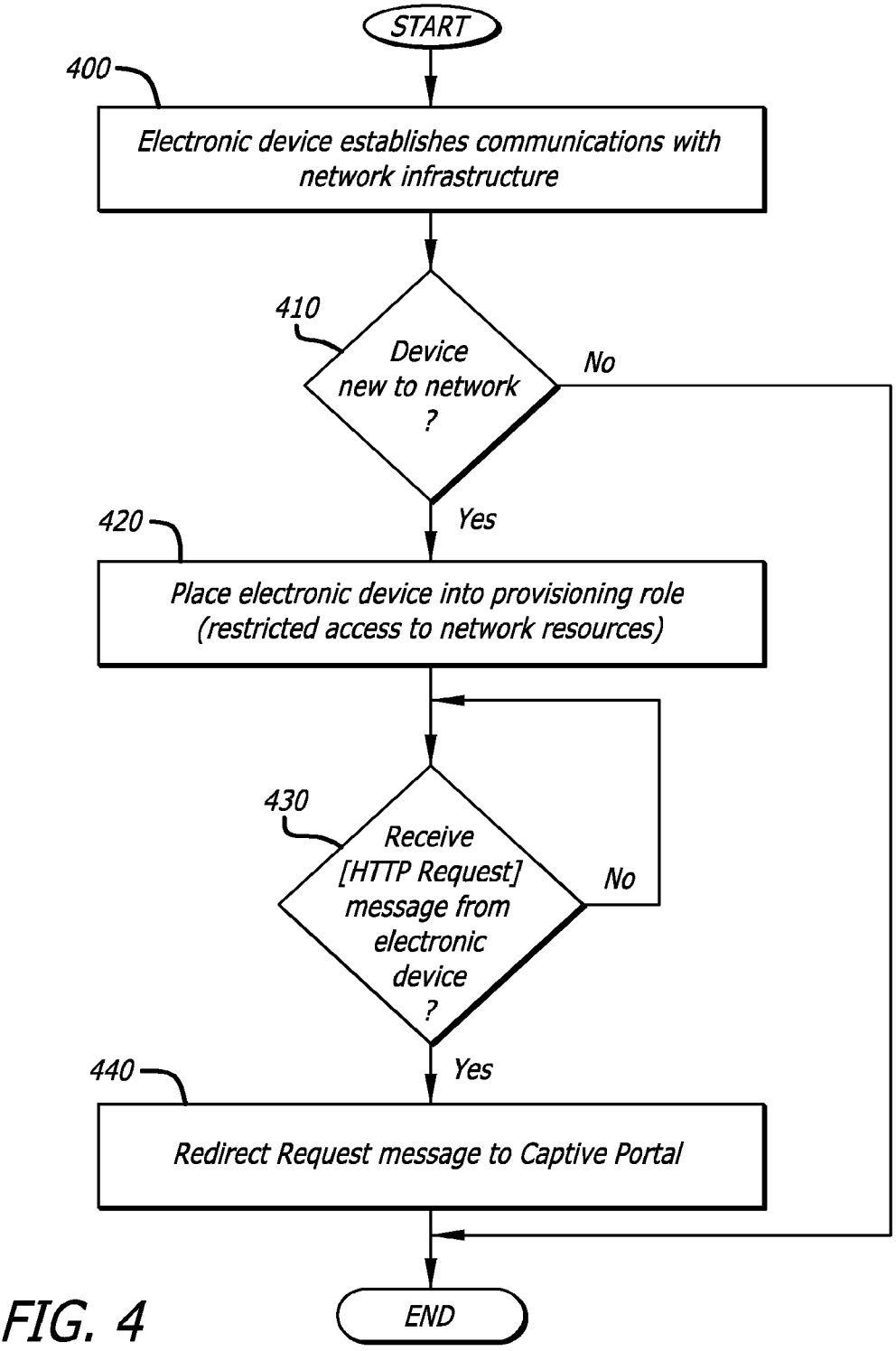
FIG. 4 is an exemplary flowchart of operations of a Pre-Provisioning Stage in order to gather information necessary to provision unique device credentials to a newly identified electronic device.

Referring to FIG. 4, an exemplary flowchart of operations of this Pre-Provisioning Stage in order to gather information necessary to provision unique device credentials to a newly identified electronic device is shown. Initially, an electronic device establishes communications with network infrastructure providing connectivity to the network (block 400). For instance, as an illustrative example, if the network is a wireless local area network (WLAN) as set forth in FIG. 2A, the electronic device detects beacon signals from an access point (AP) within the network and associates with that AP. The association may involve the exchange of PROBE REQUEST/ PROBE RESPONSE messages and ASSOCIATION REQUEST/ASSOCIATION RESPONSE messages until a communication path is established between the AP and the electronic device.

Thereafter, the authenticator within the network infrastructure applies prescribed network policies that cause the newly associated electronic device to be placed into a provisioning role where access to the network resources is partially or completely restricted (blocks 410 and 420). For instance, according to one embodiment set forth in the disclosure, the authenticator may adhere to a policy of "device fingerprinting" as described above. During device fingerprinting, the authenticator is responsible for monitoring messages transmitted to the network infrastructure by the electronic device to determine if the electronic device should be placed into a provisioning role.

If the electronic device has been assigned a provisioning role, namely the device is partially or completely restricted from accessing network resources 150, any messages from the electronic device are redirected to a Captive Portal instance (blocks 430 and 440). More specifically, in response to a subsequent message (e.g., HTTP Get Request) from the electronic device, the authenticator redirects the message to the Captive Portal provided by the authentication system, which analyzes the message to determine the type of electronic device and infer its capabilities as set forth in the Provisioning Stage.

B. Provisioning Stage

Figure 5:
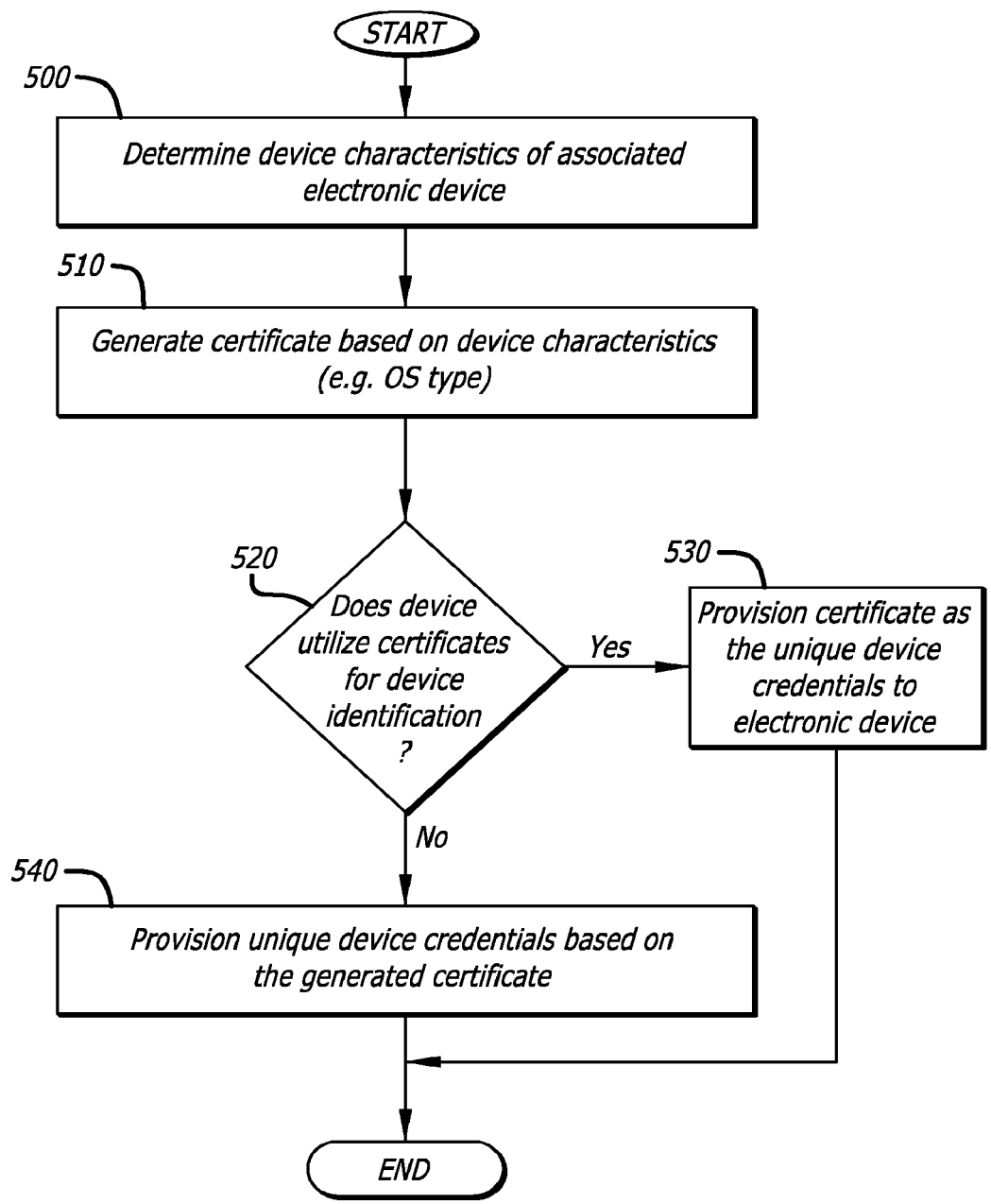
FIG. 5 is an exemplary flow diagram of the operations for the device credential provisioning as performed by an electronic device in FIG. 1.

Referring now to FIG. 5, based on device specific information forwarded by the authenticator (e.g., controller, switch and/or router, etc.), the provisioning logic within the authentication system determines the device type of the electronic device (block 500). Additionally, the authentication system causes a digital certificate to be generated for the electronic device (block 510).

According to one embodiment of the invention, as shown in FIG. 1, authentication system 130 may be adapted with certificate authority logic 280 that generates a digital certificate and maps the same with a particular electronic device. Of course, it is contemplated that authentication system 130 may be implemented with intermediary logic that procures digital certificates from an external certificate authority.

Referring back to FIG. 5, based on the detected device type, the provisioning logic within the authentication system determines if the requesting electronic device supports a certificate-based authentication (block 520). For instance, this determination checks whether the electronic device supports EAP-TLS (Extensible Authentication Protocol-Transport Layer Security) natively, and if so, the provisioning logic within the authentication system provides the generated digital certificate to the electronic device for identification and subsequent authentication (block 530).

If the electronic device supports an authentication protocol based on username and password (e.g., PEAP, EAP-MD5, EAP-GTC, etc.) instead of a certificate-based authentication protocol, the provisioning logic of the authentication system provides unique device credentials in the form of a username and password that are derived from portions of the digital certificate (block 540).

As an illustrative example, the username may be derived from a unique element of the digital certificate. According to one embodiment of the invention, the username may be derived from the certificate serial number. According to another embodiment of the invention, the username may be derived from the certificate serial number combined with a prescribed string of alphanumeric to form a unique username. According to yet another embodiment of the invention, the username may be derived from another piece of information unique to the digital certificate such as a Distinguished Name parameter.

Additionally, the cryptographically secure password is based on a private key within the digital certificate. According to one embodiment of the invention, the provisioning logic may perform one-way hash operation (e.g. MD5, SHA-1) on the private key to produce a result that is utilized as the password. According to another embodiment of the invention, the private key may undergo one or more logical operations (e.g. AND, OR, Exclusive OR "XOR", etc.) with other data from the digital certificate, and thereafter performs a hash operation on the resultant data to produce the unique password.

Figure 6A:
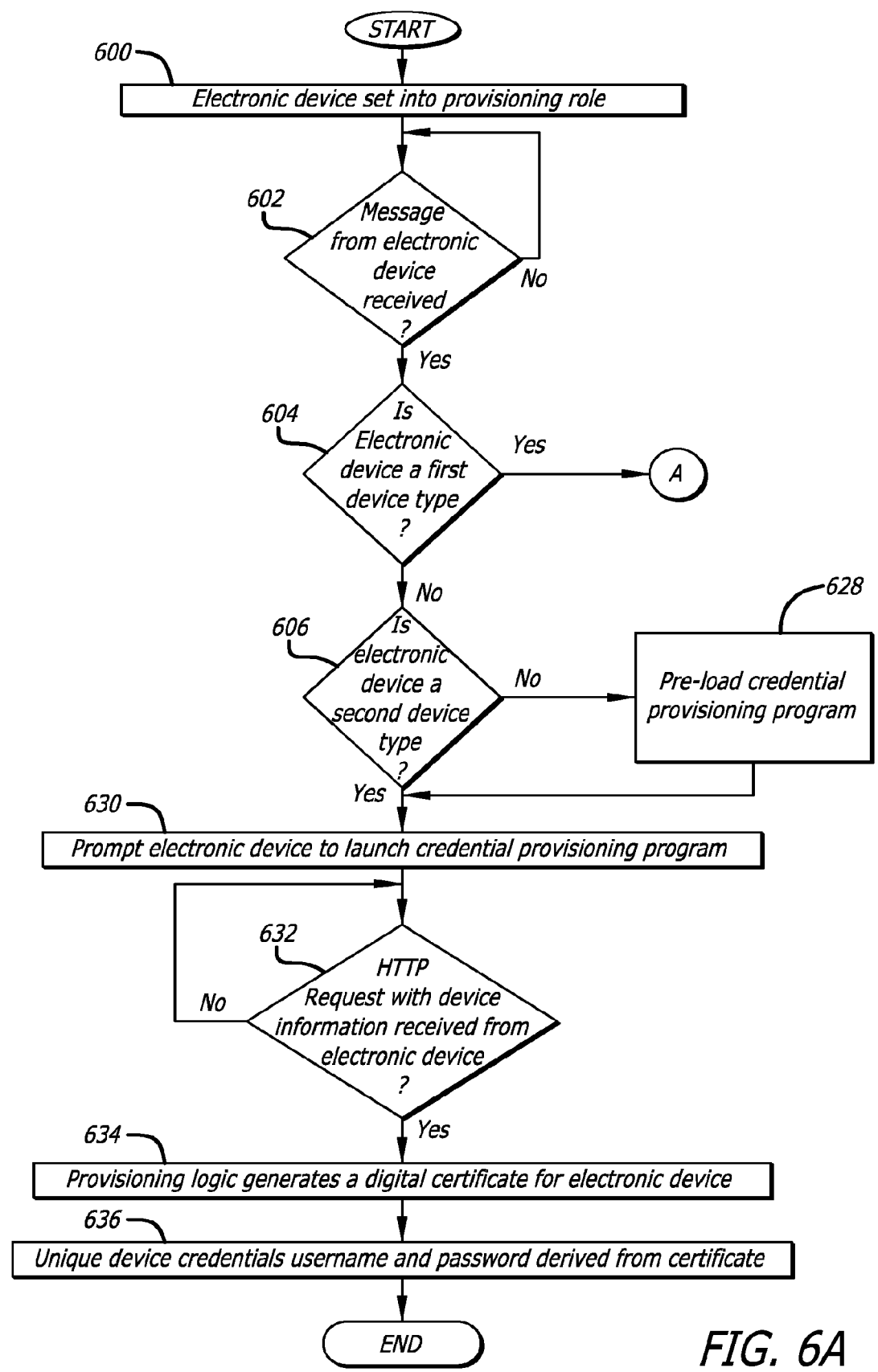
FIG. 6A is an exemplary flow diagram for assigning a unique device credentials for multiple types of electronic devices.
Figure 6B:
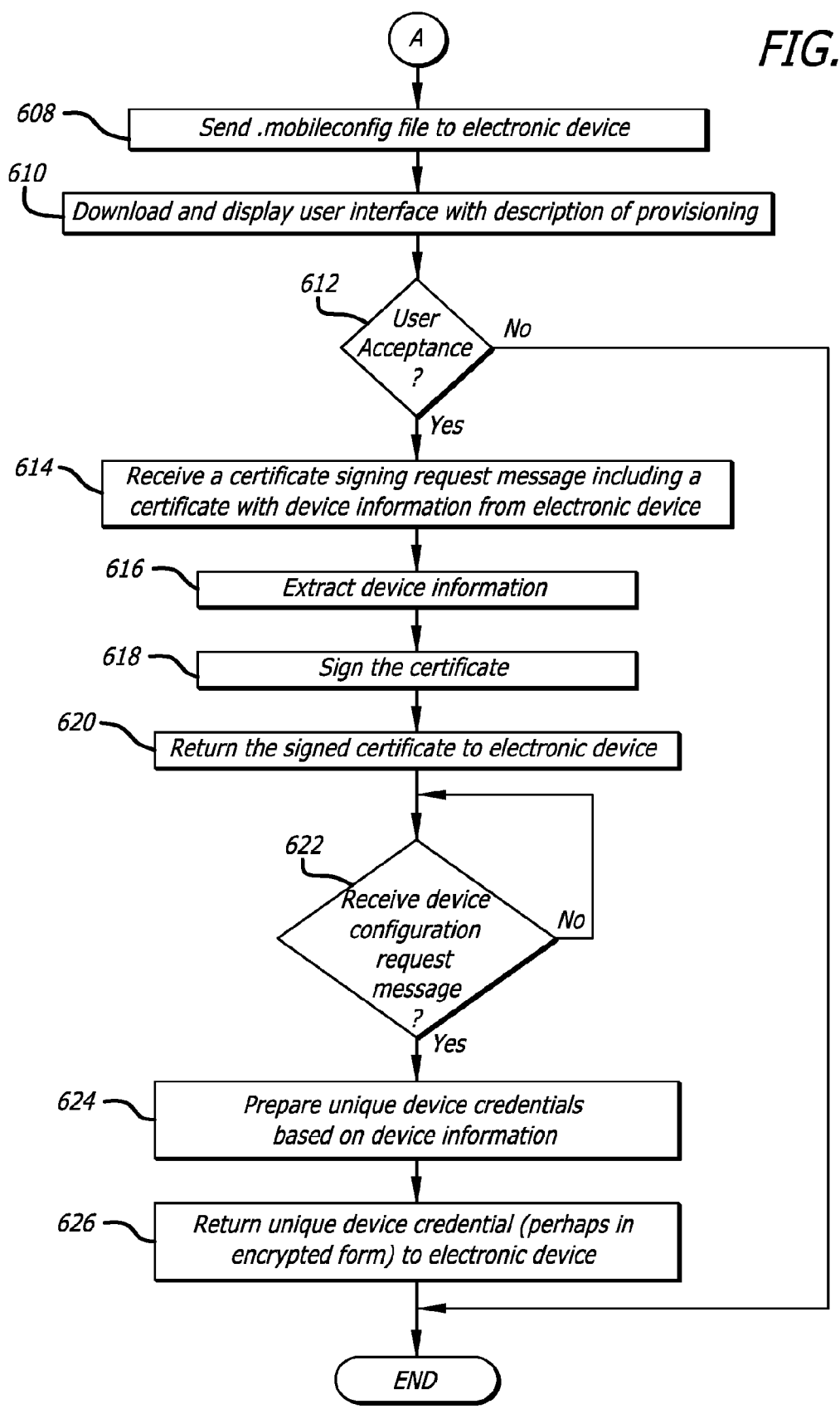
FIG. 6B is an exemplary flow diagram for assigning that unique device credentials for an electronic device of a first type.

Specific examples of various provisioning schemes are illustrated in more detail in FIGS. 6A-6B.

Referring to FIGS. 6A and 6B, exemplary flowcharts illustrating a device credential provisioning scheme performed by an electronic device implemented with a first type of operating system (e.g., Apple® iOS™) are shown. In general, unique device credentials are provisioned through generation of a digital certificate for the electronic device seeking to join a network and configuration of the electronic device to perform authentication under a secure certificate authentication protocol such as EAP-TLS for example.

More specifically, as illustrated in FIGS. 6A and 6B, electronic device has been set into a provisioning role (block 600). In response to a message from the electronic device (block 602), the authentication system determines that the electronic device is a first device type as represented in block 604 (e.g., device supporting the first OS type), and thereafter, sends a file having a particular format to the electronic device (block 608). This file, hereinafter referred to as the ".MobileConfig file," is configured to cause the electronic device, after display of a general description of upcoming provisioning operation along with preferred user acceptance before continuing (blocks 610 and 612), to contact a targeted server and provide the targeted server with particular device information (e.g., serial number, device type, product version, MAC address, etc.) for enrollment onto the network. The .MobileConfig file may be signed for verification of its origination from a trusted source.

More specifically, after the user agrees to the transfer of the device information, the electronic device launches a SCEP (Simple Certificate Enrollment Protocol) where the electronic device generates a certificate signing request (CSR), which comprises a certificate including the device information. The electronic device transmits the CSR to the authentication system (block 614). The authentication system extracts the device information (block 616), signs the certificate (block 618), and returns the signed certificate (referred to as the "SCEP certificate") to the electronic device (block 620). Now, the device is in possession of a digital certificate (SCEP certificate) signed by a certification authority utilized by the network, which can be used by the electronic device for identification.

Upon receiving the signed SCEP certificate, the electronic device enters into a final enrollment stage by issuing a Device Configuration Request message along with the SCEP certificate to the provisioning logic of the authentication system (block 622). The "Device Configuration Request message" is a message that requests unique device credentials. According to one embodiment of the invention, the unique device credentials include appropriate network settings (e.g., WiFi™ settings, email settings, URL links, icons, etc.) that are generated and provided by the provisioning logic based on the device information provided as well as information (e.g., TLS client certificate, BSSIDs, etc.) to perform EAP-TLS authentication (blocks 624 and 626). The unique device certificate may be encrypted (and readable only by the electronic device) in order to ensure security of such information.

Referring back to FIG. 6A, upon determining that the electronic device is a second device type having a different operating system (e.g., Windows® or MAC OS X™), the authentication system prompts the electronic device to launch a credential provisioning program (e.g. enhanced version of QuickConnect™ by Aruba Networks, Inc.) that now provides an additional ability of customizing the network settings for each particular device instead of a uniform customization (block 630). The credential provisioning program may be pre-loaded into internal memory of electronic device or accessible through Captive Portal.

According to one embodiment of the disclosure, credential provisioning program sends an HTTP request message along with device information for the electronic device to the provisioning logic (block 632). The provisioning logic generates a digital certificate to correspond to the electronic device and derives the unique device credentials from the certificate (blocks 634 & 636). This derivation is designed so that the unique device credentials, namely a username and password combination, is produced from the digital certificate. As a result, the unique device credentials may be revoked in response to revocation of the digital certificate upon which these credentials are based. Moreover, there is no secondary storage necessary for the username and password for authentication purposes.

Figure 7:
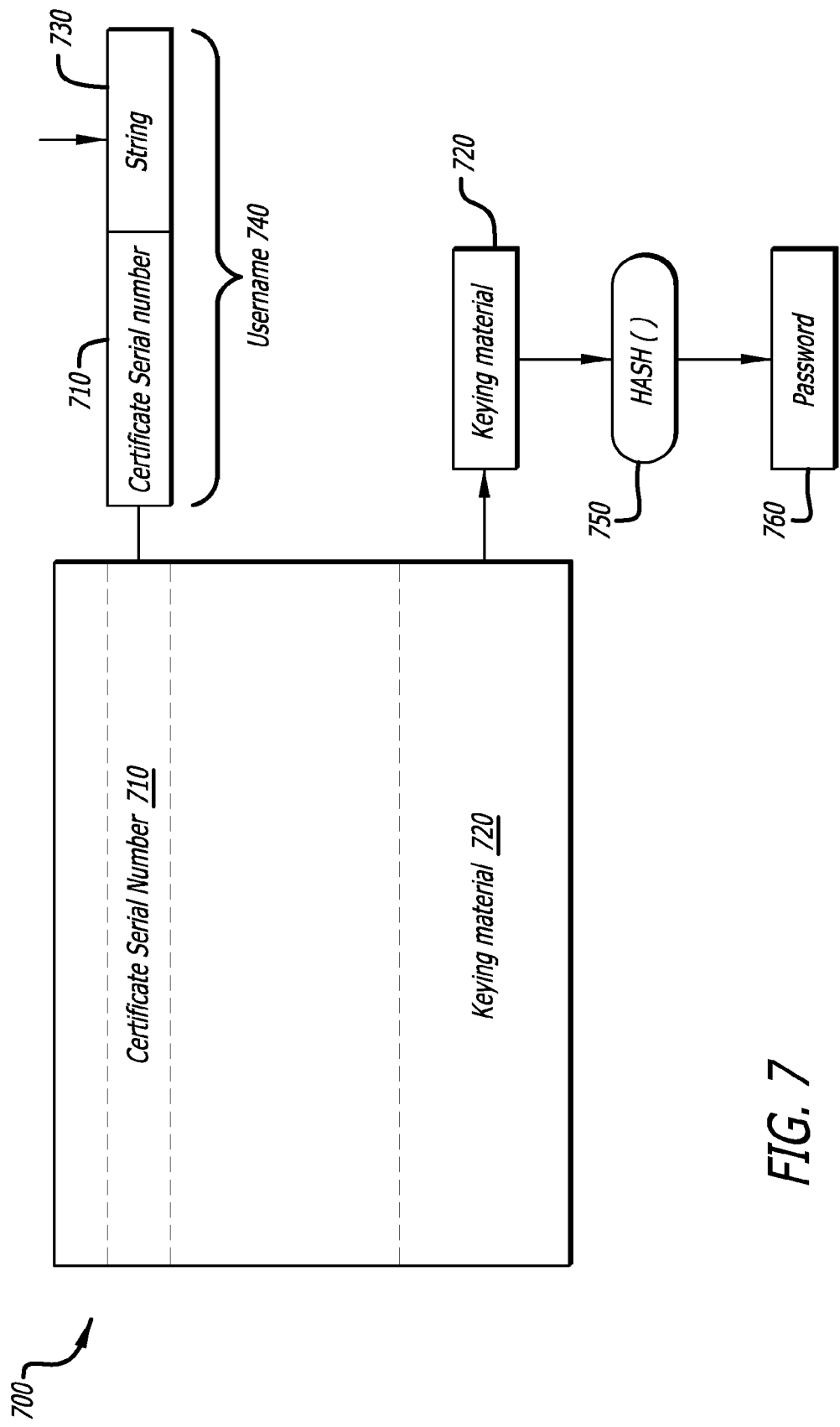
FIG. 7 is an exemplary embodiment of a digital certificate.

As shown in FIG. 7, a digital certificate 700 comprises a plurality of information elements that are unique to this particular certificate. For instance, digital certificate 700 includes a certificate serial number 710 and keying material 720 (e.g., private key), both of which are unique to digital certificate 700. As shown, a separate string of alphanumeric characters 730 may be appended to certificate serial number 710 (or alternatively a portion or derivation of certificate serial number) to form a unique username 740.

Additionally, keying material 720 from digital certificate 700 may be extracted and uniquely altered to form the password. For example, keying material 720 may undergo a one-way hash operation 750, such as MD5, SHA-1 for example, to produce a result that is utilized as the password 760. According to another embodiment of the invention, keying material 720 may undergo a logical operation (e.g. AND, OR, Exclusive OR "XOR", NOR, etc.) with other data from digital certificate 700, and thereafter, the resultant data undergoes a hash operation to produce the unique password.

The username and password are provided as device credentials to the electronic device of the second device type for use in a username/password based authentication protocol.

Lastly, referring back to FIG. 6A, if the electronic device is a third device type (e.g. implemented with a third type of operating system such as Android® OS™), the provisioning logic of the authentication system performs an additional operation. The reasons is that, for Windows® and MAC® OS X® platforms, from the web browser, a program can be selected for download and run. For electronic devices with the Android® OS, however, the credential provisioning program needs to be pre-loaded before it can be run. For instance, a small MIME type file can be loaded onto the Android® device that is registered with the QuickConnect™ application on the phone. The browser then starts the QuickConnect™ application, which proceeds to obtain the unique device credential from the provisioning logic as set forth in operations 630-636.

C. Device Authentication Stage

Figure 8:
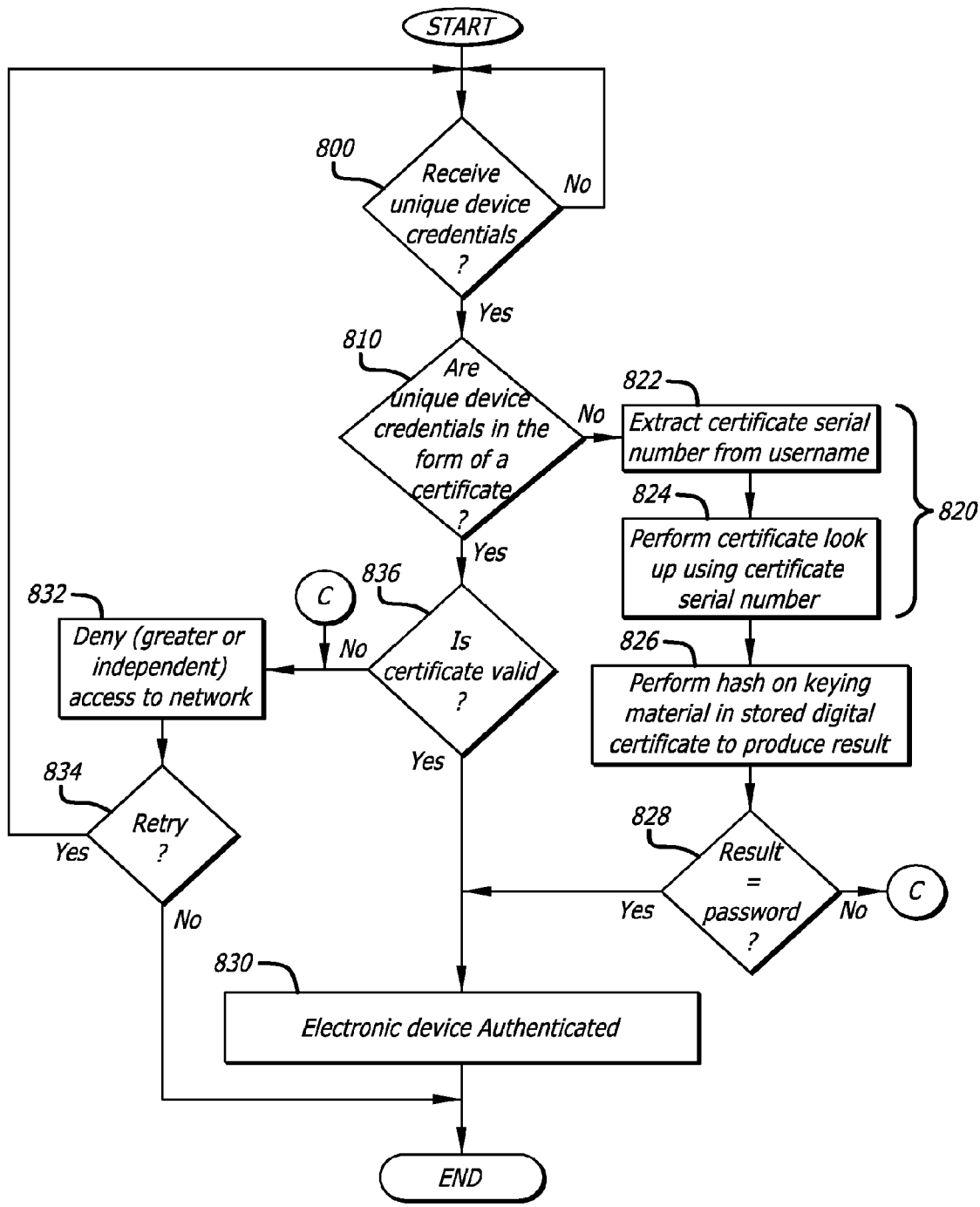
FIG. 8 is an exemplary flowchart of port-based network access control supporting device credential authentication.

Referring to FIG. 8, when attempting to join a network, the provisioned electronic device provides the unique device credentials as part of a message to join the network (block 800). Upon receiving unique device credentials, authentication logic within the authentication system determines if these credentials are in the form of a digital certificate (block 810). If not, as the unique device credentials may be in the form of a username and password, the username is used to locate the stored digital certificate issued for the electronic device (block 820).

According to one embodiment of the invention, this may be conducted by extracting the certificate serial number from the username (block 822) and performing a lookup of stored, active (non-revoked) digital certificates (block 824). Thereafter, the keying material from the stored digital certificate may undergo a hash operation to produce a result (block 826). Next, the authentication logic compares the result with the password (block 828), and if a match is detected, the electronic device is authenticated (block 830). If not, access to the network is denied (block 832). The authentication process may be configured to allow for retries (e.g., unlimited retries, only "q" (q≥1) retries as set by administrator, etc.) as set forth in block 834.

Where the unique device credentials are a certificate, the digital certificate may also be checked to determine if it has been revoked, where the certificate authority controls access to the network through certificate revocation. For instance, if the digital certificate matches the stored list of active digital certificates (block 836), the electronic device is authenticated and assigned network privileges that control the amount of access the user of the device has to network resources. Otherwise, the electronic device is not authenticated so that the electronic device still remains in its provisioning role where communications are intercepted by Captive Portal so access to the network is limited to such connections (block 832). Of course, the electronic device may be prompted to retry the authentication process if retries are permitted (block 834).

The authentication process also provides an ability to revoke a certificate through a revocation list or OCSP (online certificate status protocol) that allows the authentication logic to check with an updated remote source whether the certificate has been revoked. It is contemplated that additional operations may be performed in response to a determination that the digital certificate has been revoked. As an example, the authentication system may return signaling to the electronic device to enter into an inoperable state or activate its radio in order to determine its geographic location.

Figure 9:
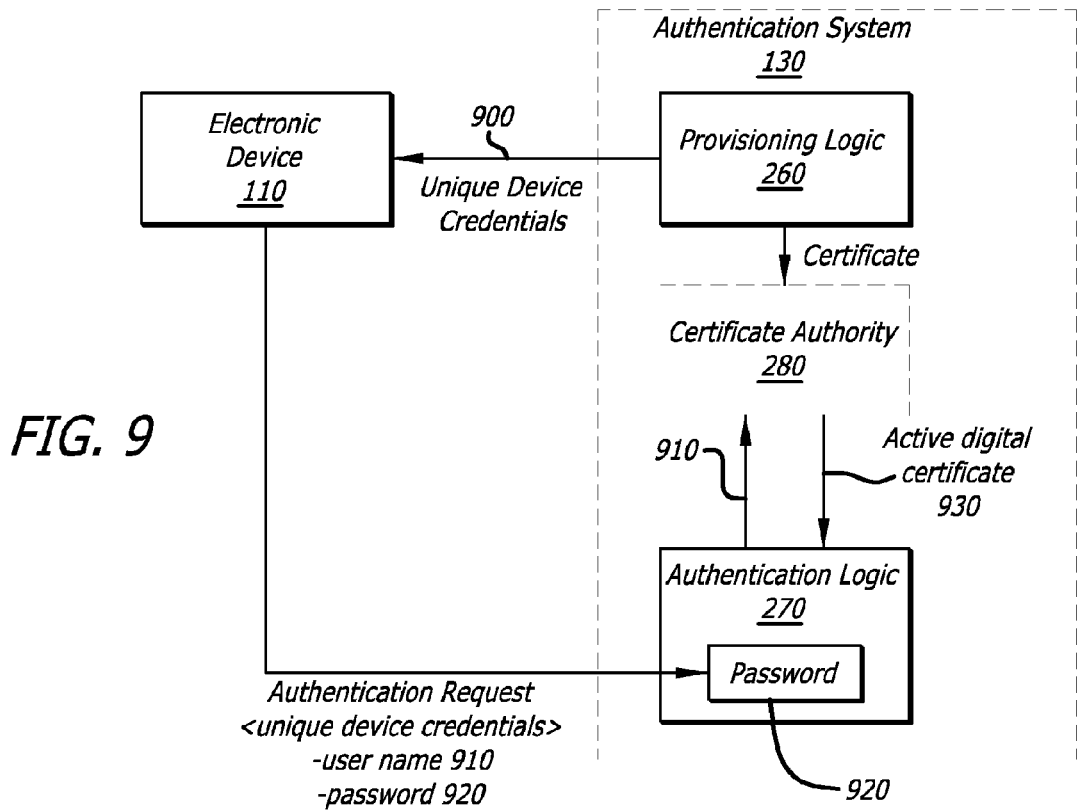
FIG. 9 is an exemplary flow diagram of the operations for authentication system supporting device credential provisioning and authentication.

Referring now to FIG. 9, an exemplary flow diagram of the operations for authentication system 130 supporting the device credential provisioning and authentication are shown. Herein, authentication system 130 comprises provisioning logic 260, authentication logic 270 and an optional certificate authority 280. In particular, certificate authority 280 may be adapted within authentication system 130 or may operate as an intermediary to procure a digital certificate from a remotely located certificate provider.

Upon determining device type for electronic device 110 as described above, provisioning logic 260 provides unique device credentials 900 to electronic device 110. These device credentials 900 are unique to electronic device 110 and may have a different format depending on the type of authentication protocol supported (e.g. certificate when certificate-based authentication is supported, username/password authentication where password based authentication is supported, etc.).

Upon receiving unique device credentials 900, electronic device 110 uses these credentials when attempting to join the network whose access is controlled by authentication system 130. Unique device credentials 900 not only identify electronic device 110 but also can be used to identify the level of network access provided to the user of electronic device 110.

During authentication, electronic device 110 sends an Authentication Request, including unique device credentials 900, to authentication logic 270 of authentication system 130. If unique device credentials 900 include a username 910 and password 920, these parameters are used to (i) attempt to locate the stored, active digital certificate in certificate authority 280 from which the credentials are based, and if located, (ii) determine if password matches unique information contained herein. If a match is detected, as the unique device credentials are formed from particular information within the digital certificate as described above, then the electronic device has been authenticated and is provided unsupervised access to the network.

However, if unique device credentials 900 include a digital certificate 930, this certificate is compared to active certificates accessible by authentication logic 270. Alternatively, a comparison may be performed by reviewing the revocation list stored in authentication system 130 and/or a revocation list stored remotely via OCSP (Online Certificate Status Protocol). This allows authentication logic 270 to check updated status on whether the certificate has been revoked.

Figure 10:
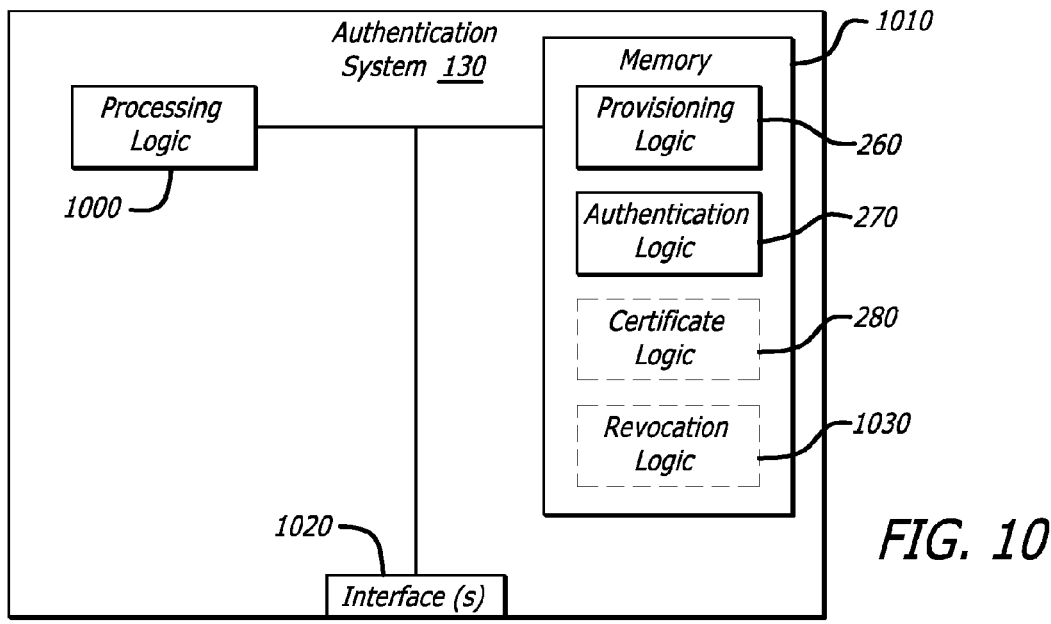
FIG. 10 is an exemplary block diagram of a network device supporting device credential provisioning and authentication.

Referring to FIG. 10, an exemplary block diagram of authentication system 130, which is implemented with provisioning logic 260 and authentication logic 270 and may be formulated with one or more electronic devices, is shown. Herein, authentication system 130 is an electronic device that comprises processing circuitry 1000, memory 1010 and one or more interfaces 1020 that are adapted to transmit and receive communications from other network devices. For instance, interface 1020 may be an antenna unit for transmitting and/or receiving wireless signals from other network devices. Additionally, or in the alternative, interface 1020 may be implemented as a physical interface including one or more ports for wired connectors.

As shown in FIG. 10, processing circuitry 1000 is coupled to memory 1010 to upload for execution provisioning logic 260 stored in memory 1010. Provisioning logic 260 is configured to control the provisioning of unique device credentials to one or more requesting electronic devices while authentication logic 270 (and optionally certificate authority logic 280) is configured to authenticate an electronic device requesting to join the network as described above. Similarly, revocation logic 1030 is responsible for digital certificate revocation which, when performed, restricts and/or precludes network access by an electronic device that previously relied on the digital certificate or information associated with the digital certificate (e.g. username and/or password) for access to the network.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A non-transitory computer readable storage medium comprising instructions which, when executed by one or more hardware processors, is configured to perform operations comprising:
   receiving a Dynamic Host Configuration Protocol (DHCP) discovery message from a client device;
   based on the DHCP discovery message, determining a type of an authentication protocol supported by the client device;
   based on the type of the authentication protocol that is determined based on the DHCP discovery message, selecting a procedure from a plurality of procedures for generating one or more unique device credentials for sending to the client device;
   generating the one or more unique device credentials using the selected procedure;
   sending the one or more unique device credentials to the client device.

2. The computer readable storage medium of claim 1, wherein the type of the authentication protocol is determined based on a DHCP Options field in the DHCP discovery message.

3. The computer readable storage medium of claim 1, wherein the type of the authentication protocol is determined based on an Operating System supported by the client device.

4. The computer readable storage medium of claim 1, wherein the type of the authentication protocol comprises a certificate-based authentication protocol.

5. The computer readable storage medium of claim 4, wherein the one or more unique device credentials comprises a digital certificate.

6. The computer readable storage medium of claim 1, wherein the type of the authentication protocol comprises a noncertificate-based authentication protocol.

7. The computer readable storage medium of claim 6, wherein the one or more unique device credentials comprises at least one credential other than a digital certificate.

8. A method comprising:
   receiving a Dynamic Host Configuration Protocol (DHCP) discovery message from a client device;
   based on the DHCP discovery message, determining a type of an authentication protocol supported by the client device;
   based on the type of the authentication protocol that is determined based on the DHCP discovery message, selecting a procedure from a plurality of procedures for generating one or more unique device credentials for sending to the client device;
   generating the one or more unique device credentials using the selected procedure;
   sending the one or more unique device credentials to the client device;
   wherein the method is performed by at least one device comprising a hardware processor.

9. The method of claim 8, wherein the type of the authentication protocol is determined based on a DHCP Options field in the DHCP discovery message.

10. The method of claim 8, wherein the type of the authentication protocol is determined based on an Operating System supported by the client device.

11. The method of claim 8, wherein the type of the authentication protocol comprises a certificate-based authentication protocol.

12. The method of claim 11, wherein the one or more unique device credentials comprises a digital certificate.

13. The method of claim 8, wherein the type of the authentication protocol comprises a non-certificate-based authentication protocol.

14. The method of claim 13, wherein the one or more unique device credentials comprises at least one credential other than a digital certificate.

15. A device comprising:
one or more hardware processors;
the device being configured to perform operations comprising:
receiving a Dynamic Host Configuration Protocol (DHCP) discovery message from a client device;
based on the DHCP discovery message, determining a type of an authentication protocol supported by the client device;
based on the type of the authentication protocol that is determined based on the DHCP discovery message, selecting a procedure from a plurality of procedures for generating one or more unique device credentials for sending to the client device;
generating the one or more unique device credentials using the selected procedure;
sending the one or more unique device credentials to the client device.

16. The device of claim 15, wherein the type of the authentication protocol is determined based on a DHCP Options field in the DHCP discovery message.

17. The device of claim 15, wherein the type of the authentication protocol is determined based on an Operating System supported by the client device.

18. The device of claim 15, wherein the type of the authentication protocol comprises a certificate-based authentication protocol.

19. The device of claim 18, wherein the one or more unique device credentials comprises a digital certificate.

20. The device of claim 15, wherein the type of the authentication protocol comprises a non-certificate-based authentication protocol.

21. The device of claim 20, wherein the one or more unique device credentials comprises at least one credential other than a digital certificate.

* * * * *